US 6,684,473 B1

(12) United States Patent
Yamagishi et al.

(10) Patent No.: US 6,684,473 B1
(45) Date of Patent: Feb. 3, 2004

(54) METHOD OF AND APPARATUS FOR MANUFACTURING BELT FOR CONTINUOUSLY VARIABLE TRANSMISSION

(75) Inventors: Hiroaki Yamagishi, Sayama (JP); Tetsuo Suzuki, Sayama (JP); Katsuyuki Nakajima, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 66 days.

(21) Appl. No.: 09/671,977

(22) Filed: Sep. 27, 2000

(30) Foreign Application Priority Data

Oct. 21, 1999 (JP) .......................... 11-299233
Nov. 16, 1999 (JP) .......................... 11-324944
Nov. 24, 1999 (JP) .......................... 11-332821

(51) Int. Cl.[7] .............................................. B23Q 17/00
(52) U.S. Cl. .............................. 29/407.01; 29/407.05; 29/505; 73/862.453
(58) Field of Search .................... 29/407.01, 407.05, 29/505

(56) References Cited

U.S. PATENT DOCUMENTS

| | | | |
|---|---|---|---|
| 3,171,278 A | * | 3/1965 | Howard |
| 3,839,968 A | * | 10/1974 | Casper |
| 4,480,487 A | | 11/1984 | Kunzfeld |
| 4,692,985 A | * | 9/1987 | Van Dijk |
| 4,831,741 A | * | 5/1989 | Sogoian |
| 4,860,597 A | * | 8/1989 | Fenech |
| 4,894,049 A | * | 1/1990 | Koppelaars |
| 5,078,655 A | * | 1/1992 | Brandenstein |
| 5,243,532 A | * | 9/1993 | Macchiarulo |

FOREIGN PATENT DOCUMENTS

| | | |
|---|---|---|
| EP | 0279473 | 8/1988 |
| EP | 0922884 A2 * | 6/1999 |
| JP | 5922344 | 2/1984 |
| JP | A63057942 | 3/1988 |
| JP | 534354 | 8/1993 |

* cited by examiner

Primary Examiner—Douglas Olms
Assistant Examiner—Steve Blount
(74) Attorney, Agent, or Firm—Birch, Stewart, Kolasch & Birch, LLP

(57) ABSTRACT

A belt for use in a continuously variable transmission comprises an annular hoop of laminated metal elements each having a body and a head joined thereto with a pair of recesses defined therebetween, and a pair of rings inserted respectively in the recesses and each comprising a plurality of laminated metal web-shaped rings. The belt is manufactured by an element production line for producing the elements through a plurality of processes, a ring production line for producing the laminated rings through a plurality of processes parallel to the element production line, and a belt assembly line joined to the element production line and the ring production line, for bundling the elements with the laminated rings thereby to assemble the belt. The elements are inspected for a produced state thereof at a terminal end of the element production line and those elements which are judged as acceptable are sent to the belt assembly line. The laminated rings are inspected for a laminated state thereof at a terminal end of the ring production line and those laminated rings which are judged as acceptable are sent to the belt assembly line. Belts are inspected for an assembled state at the belt assembly line and those belts which are judged as acceptable are delivered as products.

6 Claims, 10 Drawing Sheets

METHOD OF AND APPARATUS FOR MANUFACTURING BELT FOR CONTINUOUSLY VARIABLE TRANSMISSION

BACKGROUND OF THE INVENTION

1. Field of the Invention

The present invention relates to a method of and an apparatus for manufacturing a belt for use in a continuously variable transmission.

2. Description of the Related Art

There is known a belt for use in a continuously variable transmission which comprises an annular hoop of laminated metal elements each having a body and a head joined thereto with a pair of recesses defined therebetween, and a pair of rings inserted respectively in the recesses and each comprising a plurality of laminated metal web-shaped rings.

The above hoop is manufactured by forming elements on an element production line, forming laminated rings on a ring production line, and assembling the elements and the laminated rings together on a belt assembly line.

On the element production line, elements of desired shape are blanked out of a metal plate, tempered, and then finished by grinding. On the ring production line, sheet-like rings of desired shape are rolled from ring-shaped metal sheets, then subjected to a solution treatment, corrected for their circumferential length, aged and nitrided, and then laminated into a ring.

One known belt assembling process for being carried out on the belt assembly line is disclosed in Japanese laid-open utility model publication No. 59-22344. According to the disclosed belt assembling process, an annular hoop of laminated elements is held in an annular support groove defined in a block stand. Recesses defined in the respective elements are successively arranged in an annular pattern, and are open on one side of the hoop. Then, a laminated ring is pushed into the successively arranged recesses. At this time, the laminated ring is guided by an annular guide having a tapered guide surface whose diameter is progressively larger in the direction in which the laminated ring is inserted into the recesses, so that the laminated ring has its diameter progressively increased as it is guided into the recesses.

The above conventional process of manufacturing a belt for a continuously variable transmission, or particularly the known belt assembling process, suffers the following problem: If gaps smaller than the thickness of an element are created between the elements that are placed in the support groove in the block stand due to thickness errors of the elements, then since no element can be inserted into the gaps to bring the elements into intimate contact with each other, the elements bundled together by the laminated ring tend to be spaced excessively from each other, resulting in poor belt performance.

According to the above conventional belt manufacturing process, if the head of each element has dimples and holes defined in both face and back sides thereof (see, for example, Japanese laid-open patent publication No. 63-57942 and Japanese utility model publication No. 5-34354), then the dimples present an obstacle making it difficult to hold a desired number of elements in the support groove in the block stand.

Furthermore, according to the above conventional belt manufacturing process, inasmuch as the laminated ring is increased in diameter by the annular guide with the tapered guide surface, if the laminated ring has circumferential length variations and its circumferential length is relatively small, then it is difficult for the laminated ring to be increased in diameter by the tapered guide surface. If the laminated ring whose circumferential length is relatively small is forcibly slid along the tapered guide surface to increase its diameter, then the laminated ring may possibly be damaged.

Elements that are manufactured on the element production line may be bent or damaged, or laminated rings manufactured on the ring production line may be in a poorly laminated state. If elements are bent or damaged or laminated rings are in a poorly laminated state, then continuously variable transmission belts assembled on the belt assembly line are of lowered quality.

One solution is to inspect continuously variable transmission belts assembled on the belt assembly line for their assembled state. For example, clearances between elements bundled by laminated rings of a continuously variable transmission belt are selected at some locations, and visually measured by a manually applied thickness gage. If the measured clearances are smaller than a predetermined dimension, then the continuously variable transmission belt is judged as being in a well assembled state. If the measured clearances are greater than the predetermined dimension, then the continuously variable transmission belt is judged as being in a poorly assembled state and hence is rejected.

The above inspection process is disadvantageous in that the inspection process is not efficient as it involves the manual application of the thickness gage and tends to suffer accuracy variations due to inspection personnel differences and different skill levels. In addition, if the clearances between elements which have not been measured are not acceptable or the number of elements that make up a continuously variable transmission belt is not sufficient, then the performance of the continuously variable transmission belt is adversely affected.

With the above inspection process, furthermore, it is difficult to identify causes of defective assembled states. Specifically, continuously variable transmission belts may be assembled defectively because some elements are bent or cracked or laminated rings are not in a well laminated state. Any of these causes cannot easily be identified simply by measuring the clearances between elements according to the above inspection process. Therefore, when a continuously variable transmission belt is judged as being assembled defectively, the judgment cannot quickly and smoothly be reflected in adjustments of various apparatus of the element production line and the ring production line.

Still another problem of the above inspection process is that even if produced elements include defective elements, since continuously variable transmission belts need to be actually assembled in order to be inspected according to the inspection process, some of the assembled continuously variable transmission belts cannot be delivered as products due to those defective elements, and hence the efficiency of the belt assembly line is low.

SUMMARY OF THE INVENTION

It is therefore an object of the present invention to provide a method of manufacturing a belt for use in a continuously variable transmission efficiently in a well assembled state by rejecting in advance defective elements and laminated rings.

To achieve the above object, there is provided in accordance with an aspect of the present invention a method of manufacturing a belt for use in a continuously variable transmission which comprises an annular hoop of laminated metal elements each having a body and a head joined thereto with a pair of recesses defined therebetween, and a pair of rings inserted respectively in the recesses and each comprising a plurality of laminated metal web-shaped rings, with an element production line for producing the elements through a plurality of processes, a ring production line for producing the laminated rings through a plurality of processes parallel to the element production line, and a belt assembly line joined to the element production line and the ring production line, for bundling the elements with the laminated rings thereby to assemble the belt. The method comprises the steps of inspecting the elements for a produced state thereof at a terminal end of the element production line and sending those elements which are judged as acceptable to the belt assembly line, inspecting the laminated rings for a laminated state thereof at a terminal end of the ring production line and sending those laminated rings which are judged as acceptable to the belt assembly line, and inspecting belts for an assembled state at the belt assembly line and delivering those belts which are judged as acceptable as products.

On the element production line, the elements are produced through the plurality of processes, and then inspected. In the element inspecting step, the elements are inspected for bends, scratches, cracks, etc., and those elements that are judged as acceptable are delivered to the belt assembly line. If produced elements are judged as defective in the element inspecting step, then the inspected data can easily be reflected in adjustments of various apparatus on the element production line for increasing the accuracy with which elements are produced. Only those elements which are produced with desired accuracy can be sent to the belt assembly line.

On the ring production line, after the rings are assembled, they are inspected. In the ring inspecting step, the rings are inspected for the number of web-shaped rings and the degree to which the web-shaped rings are held in close contact with each other, and only those laminated rings that are judged as acceptable are delivered to the belt assembly line. If produced laminated rings are judged as defective in the ring inspecting step, then the inspected data can easily be reflected in adjustments of various apparatus on the ring production line for increasing the accuracy with which laminated rings are produced. Only those laminated rings which are produced with desired accuracy can be sent to the belt assembly line.

On the belt assembly line, the efficiency with which to produce belts is increased because belts are assembled of acceptable elements and acceptable laminated rings.

On the belt assembly line, after a belt is assembled, the belt is inspected for quality. When the belt is assembled, since the elements and the laminated rings thereof have already been judged as acceptable in the element inspecting step and the ring inspecting step, the number of any defectively assembled belts is extremely small. If an assembled belt is judged as defective in the belt inspecting step, then since the elements and the laminated rings thereof have already been judged as acceptable, it can easily be determined that the defect of the assembled belt is caused on the belt assembly line. The inspected data can thus easily be reflected in adjustments of various apparatus on the belt assembly line.

Another object of the present invention is to provide a method of and an apparatus for manufacturing a belt for use in a continuously variable transmission by bundling elements closely held together with laminated rings, the number of elements depending on the circumferential length of the laminated rings, so that the belt can easily be assembled with high accuracy.

To achieve the above object, there is provided in accordance with another aspect of the present invention a method of manufacturing a belt for use in a continuously variable transmission which comprises an annular hoop of laminated metal elements each having a body and a head joined thereto with a pair of recesses defined therebetween, and a pair of rings inserted respectively in the recesses and each comprising a plurality of laminated metal web-shaped rings, comprising the steps of laminating a plurality of elements as an annular hoop with the bodies positioned inwardly, and pushing the elements in a direction from the heads toward the bodies to clamp the elements in close contact with each other, radially spreading the laminated rings which confront the respective recesses in the clamped elements to a diameter positionally corresponding to the recesses fully across the laminated rings, and pressing the radially spread laminated rings into the respective recesses in the elements.

According to the above method, a plurality of elements are laminated as an annular hoop and clamped with the bodies positioned inwardly. At this time, the elements are pushed in a direction from the heads toward the bodies to clamp the elements in close contact with each other. Thus, no clearances are produced between the elements, and the diameter of the recesses in the successive elements that are laminated is sufficiently reduced.

Then, the laminated rings which confront the respective recesses in the clamped elements are radially spread to a diameter positionally corresponding to the recesses fully across the laminated rings. Since the laminated rings are radially spread fully thereacross, the laminated rings can sufficiently be radially spread without damage as compared with a conventional process in which the laminated rings are radially spread as they are moved along a slanted surface.

Inasmuch as the diameter of the recesses in the successive elements that are laminated is sufficiently reduced, even if the distance by which the laminated rings are radially spread is relatively small, the laminated rings can easily be inserted into the successive recesses in the clamped elements, so that a highly accurate belt can be assembled.

The step of pressing the radially spread laminated rings into the respective recesses in the elements should preferably comprise the step of detecting a load applied the laminated rings while pressing the radially spread laminated rings into the respective recesses in the elements, for thereby inspecting whether the belt is acceptable or not. For example, if the laminated rings cause scoring in the recesses or the diameters of the laminated rings do not match those of the recesses, then the laminated rings is subjected to an excessively large load. Therefore, defective laminated rings can be rejected by detecting such as load.

According to still another aspect of the present invention, there is also provided an apparatus for manufacturing a belt for use in a continuously variable transmission which comprises an annular hoop of laminated metal elements each having a body and a head joined thereto with a pair of recesses defined therebetween, and a pair of rings inserted respectively in the recesses and each comprising a plurality of laminated metal web-shaped rings, comprising element holding means for holding the annular hoop of laminated metal elements with the bodies positioned inwardly and the recesses opening vertically, for movement in a direction from the heads to the bodies, element pressing means disposed in the element holding means, for pressing the annular hoop of laminated metal elements in the direction from the heads to the bodies thereby to bring the elements into close contact with each other, a first collet disposed below the element holding means, for placing one of the laminated rings therearound and radially spreading the one of the laminated rings, first spreading means for radially spreading the first collet to spread the laminated ring placed around the first collet to a diameter positionally corresponding to one of the recesses in the annular hoop of elements fully across the laminated ring, a second collet disposed above the element holding means, for placing the other of the laminated rings therearound and radially spreading the other of the laminated rings, second spreading means for radially spreading the second collet to spread the laminated ring placed around the second collet to a diameter positionally corresponding to the other of the recesses in the annular hoop of elements fully across the laminated ring, first ring pressing means for abutting against a lower edge of the laminated ring placed around the first collet and pressing the laminated ring into the one of the recesses, and second ring pressing means for abutting against an upper edge of the laminated ring placed around the second collet and pressing the laminated ring into the other of the recesses.

The element holding means holds the annular hoop of laminated metal elements for movement in a direction from the heads to the bodies. At this time, the bodies are positioned inwardly and the recesses opening vertically, and the laminated rings can be inserted into the successive recesses. The element pressing means disposed in the element holding means presses the annular hoop of laminated metal elements in the direction from the heads to the bodies. The elements are displaced in the direction from the heads to the bodies and brought into close contact with each other, so that the elements are securely clamped in position. Since the elements are brought into close contact with each other, the diameter of the successive recesses is sufficiently reduced. The element holding means holds the elements while moving them in the direction from the heads to the bodies, after which the element pressing means clamp the elements. Consequently, when the elements are laminated before they are clamped, certain clearances may be provided between the elements. The elements can thus be laminated with ease even if dimples and holes, for example, are defined in both surfaces of the elements. Thereafter, the elements are displaced in the direction from the heads to the bodies, so that the elements can easily be clamped with the dimples and the holes closely held together.

One of the laminated rings is placed around the first collet, and positioned in alignment with the successive recesses, which are open downwardly, in the clamped elements. The first spreading means radially spreads the first collet to spread the laminated ring placed around the first collet to a diameter positionally corresponding to the one of the recesses in the annular hoop of elements fully across the laminated ring.

Similarly, the other laminated ring is placed around the second collet, and positioned in alignment with the successive recesses, which are open upwardly, in the clamped elements. The second spreading means radially spreads the second collet to spread the laminated ring placed around the second collet to a diameter positionally corresponding to the other of the recesses in the annular hoop of elements fully across the laminated ring.

Since the laminated rings are supported by the respective collets and radially spread by the spreading means through the collets, each of the laminated rings can easily be radially spread sufficiently. Even if the laminated rings suffer circumferential length variations, and have relatively small circumferential lengths, the laminated rings can easily be held by the respective collets when the collets are radially contracted. Even when the laminated rings are radially spread, since the annular hoop of elements is sufficiently reduced in diameter by the element pressing means, the distance by which the laminated rings are radially spread by the collets may be relatively small, and the laminated rings can smoothly be inserted into the recesses in the elements.

Each of the elements has a pair of slanted edges on the head which are tapered toward a center thereof, and a pair of slanted edges on sides edges of the body which jointly make up a V-shaped surface for contacting the pulleys of the continuously variable transmission. The element pressing means comprises a first head holder having a first slanted surface for facing and slidably abutting against the lower slanted edges of the heads when the elements are held by the element holding means, and a second head holder disposed in alignment with the first head holder and having a second slanted surface for facing and slidably abutting against the upper slanted edges of the heads when the elements are held by the element holding means, the second head holder being movable toward the first head holder to reduce a spacing between the first slanted surface and the second slanted surface to press the heads of the elements in a direction toward the bodies thereof. The element holding means comprises a first body holder having a first slanted surface for facing and slidably abutting against the lower slanted edges of the bodies, the first body holder being vertically movable, and a second body holder disposed in alignment with the first body holder and having a second slanted surface for facing and slidably abutting against the upper slanted edges of the bodies, the second body holder being vertically movable.

The bodies of the elements are sandwiched and held between the first and second body holders of the element holding means, and the heads of the elements are sandwiched and held between the first and second head holders of the element pressing means. The second head holder is displaced toward the first head holder to press the heads of the elements toward the bodies thereof thereby to clamp the heads. Specifically, when the heads of the elements are sandwiched between the first and second head holders and the second head holder is displaced toward the first head holder, the upper slanted edges of the heads slide along the second slanted surface of the second head holder, and at the same time, the lower slanted edges of the heads slide along the first slanted surface of the first head holder, so that the heads of the elements are pressed toward the bodies thereof. As the bodies are thus displaced, the first body holder and the second body holder are also displaced to keep the bodies held thereby.

Since the elements are pressed by the first and second head holders at the slanted edges of the heads and the elements are pressed and reliably clamped simply by moving the first and second head holders toward each other, the apparatus is relatively simple in construction.

The apparatus should preferably further comprise load detecting means for detecting a load applied to the laminated rings when the laminated rings are pressed by the first ring pressing means and the second ring pressing means. When the laminated rings are inserted into the recesses in the elements, a load applied to the laminated rings can be detected while the laminated rings are being pressed into the recesses. If the load imposed on the laminated rings is excessively large, then it can be determined that the laminated rings may be causing scoring in the recesses or the diameters of the laminated rings may not be matching those of the recesses. Therefore, defective laminated rings can be rejected by detecting such as load.

According to yet another aspect of the present invention, there is also provided a method of manufacturing a belt for use in a continuously variable transmission which comprises an annular hoop of laminated metal elements each having a body and a head joined thereto with a pair of recesses defined therebetween, and a pair of rings inserted respectively in the recesses and each comprising a plurality of laminated metal web-shaped rings, comprising the steps of training the belt around a drive roller and a driven roller, displacing the drive roller and the driven roller away from each other to tension the belt, rotating the belt to break in the belt until the belt is rotated smoothly, pressing a portion of the belt between the drive roller and the driven roller while the belt is at rest or in rotation, and measuring a distance by which the belt is flexed when the portion of the belt between the drive roller and the driven roller is pressed, for thereby deciding whether the belt is acceptable or not.

After the belt is rotated under tension and broken in, the portion of the belt between the drive roller and the driven roller is pressed, and a distance by which the belt is flexed is measured. The measured distance is compared with a reference distance by which a normal belt whose clearances between the elements are appropriate and which has a required number of elements is flexed. In this manner, it can be decided whether the belt is acceptable or not. Consequently, assembled belts can efficiently be inspected with stable accuracy without inspection personnel differences and different skill levels.

Preferably, the method may further comprise the steps of positioning the drive roller and the driven roller in vertically spaced relationship to each other, and horizontally pressing the portion of the belt between the drive roller and the driven roller to decide whether the belt is acceptable or not. The portion of the belt between the drive roller and the driven roller extends substantially vertically, and a distance by which the belt is flexed when the portion of the belt between the drive roller and the driven roller is horizontally pushed is measured. Therefore, the distance by which the belt is flexed can accurately be measured. Accordingly, the assembled belt can reliably be determined as acceptable or not.

According to yet still another aspect of the present invention, there is also provided an apparatus for manufacturing a belt for use in a continuously variable transmission which comprises an annular hoop of laminated metal elements each having a body and a head joined thereto with a pair of recesses defined therebetween, and a pair of rings inserted respectively in the recesses and each comprising a plurality of laminated metal web-shaped rings, comprising an inspecting apparatus for inspecting the belt, the inspecting apparatus comprising a drive roller and a driven roller for training the belt therearound, tension applying means for displacing the drive roller and the driven roller away from each other to tension the belt, an actuator for actuating the drive roller to rotate the belt which is tensioned, pressing means for pressing a portion of the belt positioned between the drive roller and the driven roller, and measuring means for measuring a distance by which the belt is flexed when pressed by the pressing means.

Preferably, the drive roller and the driven roller are positioned in vertically spaced relationship to each other, the pressing means being disposed in confronting relationship to the portion of the belt positioned between the drive roller and the driven roller, the pressing means being horizontally movable.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
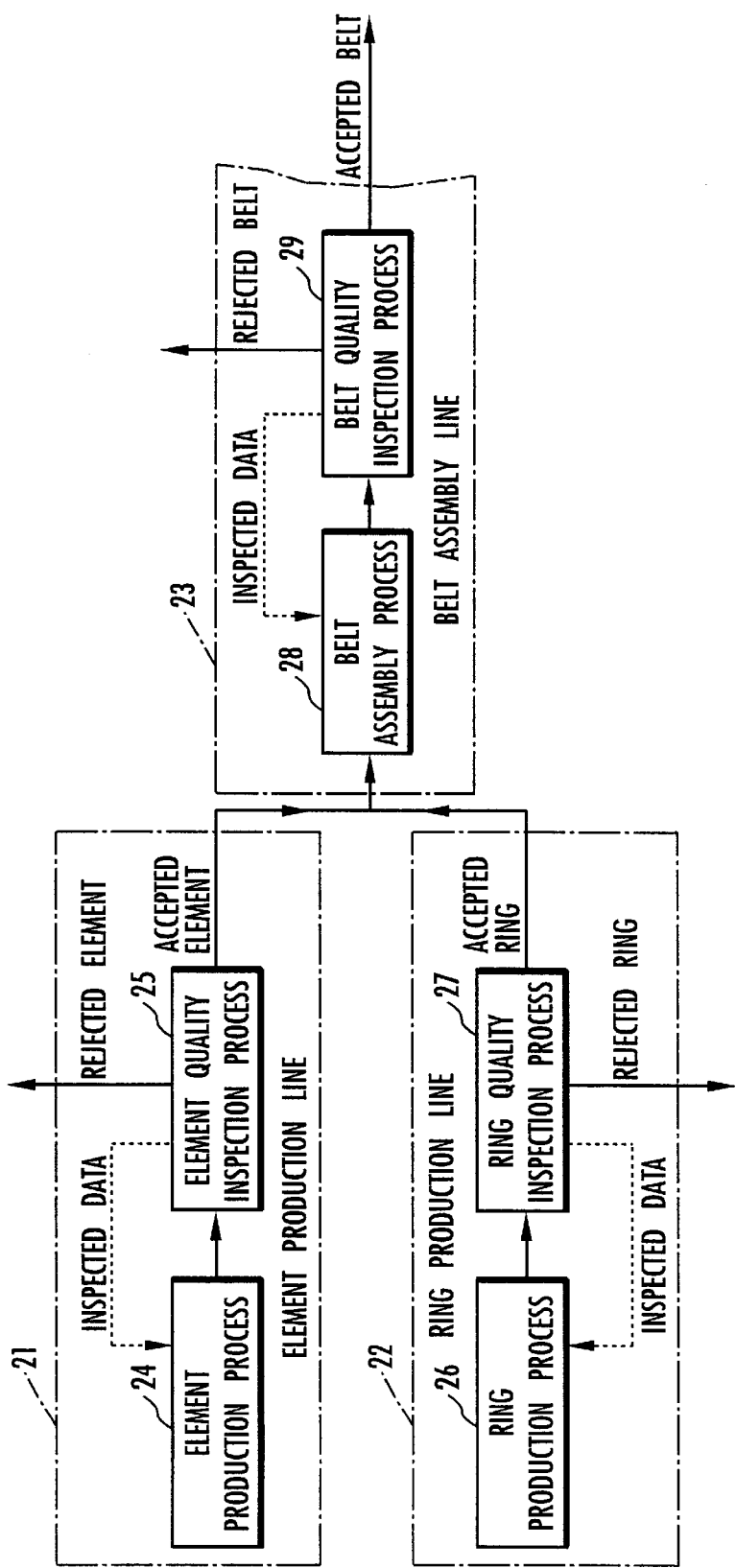
FIG. 1 is a block diagram of a method of manufacturing a belt for use in a continuously variable transmission according to the present invention.

A method of manufacturing a belt for use in a continuously variable transmission according to the present invention will first be described below with reference to FIGS. 1 and 2.

Figure 2:
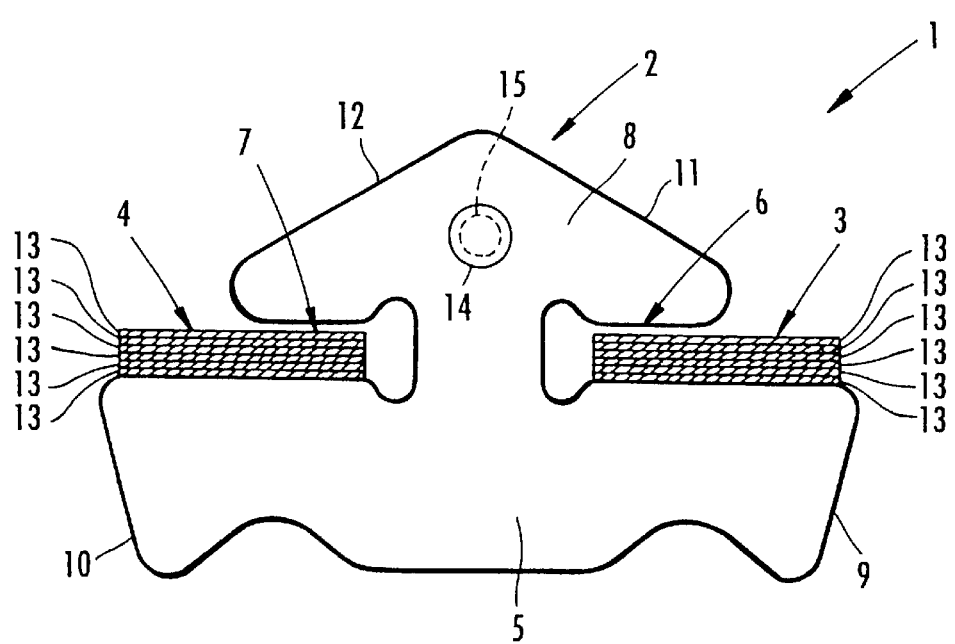
FIG. 2 is a cross-sectional view of a belt for use in a continuously variable transmission.

As shown in FIG. 2, a belt 1 for use in a continuously variable transmission comprises an annular hoop of laminated elements 2 bundled together by a pair of laminated rings 3, 4. Each of the elements 2 is blanked out of a metal plate, and comprises a body 5 and a head 8 joined thereto with a pair of recesses 6, 7 defined therebetween. The body 5 has a pair of slanted edges 9, 10 on its opposite sides which jointly make up a V-shaped surface for contacting the pulleys of a continuously variable transmission as an automobile power transmitting mechanism, not shown. The head 8 also has a pair of slanted edges 11, 12 on its opposite sides which are tapered toward a tip end thereof. The laminated rings 3, 4, each comprising a stack of plate-like metal rings 13, are disposed in the respective recesses 6, 7 and extend around the annular hoop of laminated elements 2 under tension. The head 8 of each element 2 has a dimple 14 defined in one surface thereof and concaved perpendicularly to the plane of the head 8 and a hole 15 defined in the other surface thereof in alignment with the dimple 14.

The method of manufacturing the belt 1 will be described below. As shown in FIG. 1, the method is carried out by a system including an element production line 21 for producing the elements 2, a ring production line 22 for producing the laminated rings 3, 4, and a belt assembly line 23 for assembling the belt 1. The element production line 21 and the ring production line 22 are joined to each other at their downstream ends and connected to the belt assembly line 23.

The element production line 21 has an element production process 24 comprising a plurality of steps and an element quality inspection process 25, disposed downstream of the element production process 24, for inspecting elements 2 produced by the element production process 24. The steps of the element production process 24 include the step of blanking elements 2 of desired shape out of a metal plate, the step of heat-treating the blanked elements 2, and the step of finishing the elements 2 by barrel finishing, or the like.

The element quality inspection process 25 inspects elements 2 for bends, scratches, cracks, etc., and delivers those elements 2 that are judged as acceptable to the belt assembly line 23. Those elements 2 that are judged as defective are not used as a component of the belt 2, but are rejected from the element production line 21. Inspected data of the elements 2 that are judged as defective in the element quality inspection process 25 is fed back to the element production process 24. Therefore, the inspected data can quickly and easily be reflected in operating conditions and fine adjustments of various apparatus that perform the steps of the element production process 24. The inspected data may also be used in the maintenance of the various apparatus to keep and manage the conditions of the apparatus in advance for thereby increasing the accuracy of the individual elements 2 and improving the functions of the belt 1.

The ring production line 22 has a ring production process 26 comprising a plurality of steps and a ring quality inspection process 27, disposed downstream of the ring production process 26, for inspecting laminated rings 3, 4 produced by the ring production process 26. The steps of the ring production process 26 include the step of rolling ring-shaped petal sheets into sheet-like rings 13, the step of subjecting the sheet-like rings 13 to a solution treatment and correcting the circumferential lengths of the sheet-like rings 13, the step of aging, nitriding, and laminating the sheet-like rings 13 into laminated rings 3, 4.

The ring quality inspection process 27 inspects laminated rings 3, 4 for the number of ring layers and their laminated state, and delivers those laminated rings 3, 4 which are judged as acceptable to the belt assembly line 23. Those laminated rings 3, 4 that are judged as defective are not used as a component of the belt 2, but are rejected from the ring production line 22. The rejected laminated rings 3, 4 are then disassembled into sheet-like rings 13, which are laminated again and supplied to the ring production line 22. Inspected data of the laminated rings 3, 4 that are judged as defective in the ring quality inspection process 27 is fed back to the ring production process 26. Therefore, the inspected data can quickly and easily be reflected in operating conditions and fine adjustments of various apparatus that perform the steps of the ring production process 26. The inspected data may also be used in the maintenance of the various apparatus to keep and manage the conditions of the apparatus in advance for thereby increasing the accuracy of the individual rings 13 and improving the functions of the belt 1.

The belt assembly line 23 has a belt assembly process 28 for laminating elements 2 delivered from the element production line 21 into an annular hoop, and assembling laminated rings 3, 4 delivered from the ring production line 22 into the respective recesses 6, 7 in the elements 2. Details of the belt assembly process 28 will be described in detail below.

The belt assembly line 23 also has a belt quality inspection process 29 downstream of the belt assembly line 23. Details of the belt quality inspection process 29 will be described in detail below. As with the conventional inspection process, the belt quality inspection process 29 may measure clearances between the elements 2 bundled together by the laminated rings 3, 4, judge those belts 1 whose measured clearances are smaller than a predetermined dimension as acceptable and deliver the acceptable belts, and judge those belts 1 whose measured clearances are greater than the predetermined dimension as defective and discharge the defective belts 1 from the belt assembly line 23.

The elements 2 and the laminated rings 3, 4 delivered to the belt assembly line 23 have been judged as acceptable in the element quality inspection process 25 and the ring quality inspection process 27. Therefore, any belts 1 that are judged as defective in the belt quality inspection process 29 are considered to be produced in the belt assembly process 28, but not caused by defective elements 2 or laminated rings 3, 4. Inspected data of the belts 1 that are judged as defective in the belt quality inspection process 29 is fed back to the belt assembly process 28. Therefore, the inspected data can quickly and easily be reflected in operating conditions and fine adjustments of an assembling apparatus used in the belt assembly process 28. Accordingly, the belt assembly process 28 can produce high-quality belts 1 for use in continuously variable transmissions, and do not deliver defective belts to subsequent processes.

Specific details of a method of and an apparatus for manufacturing a belt for use in a continuously variable transmission according to the present invention will be described below with reference to FIGS. 3, 4, 5(a) through 5(d), and 6(a) through 6(d).

Figure 3:
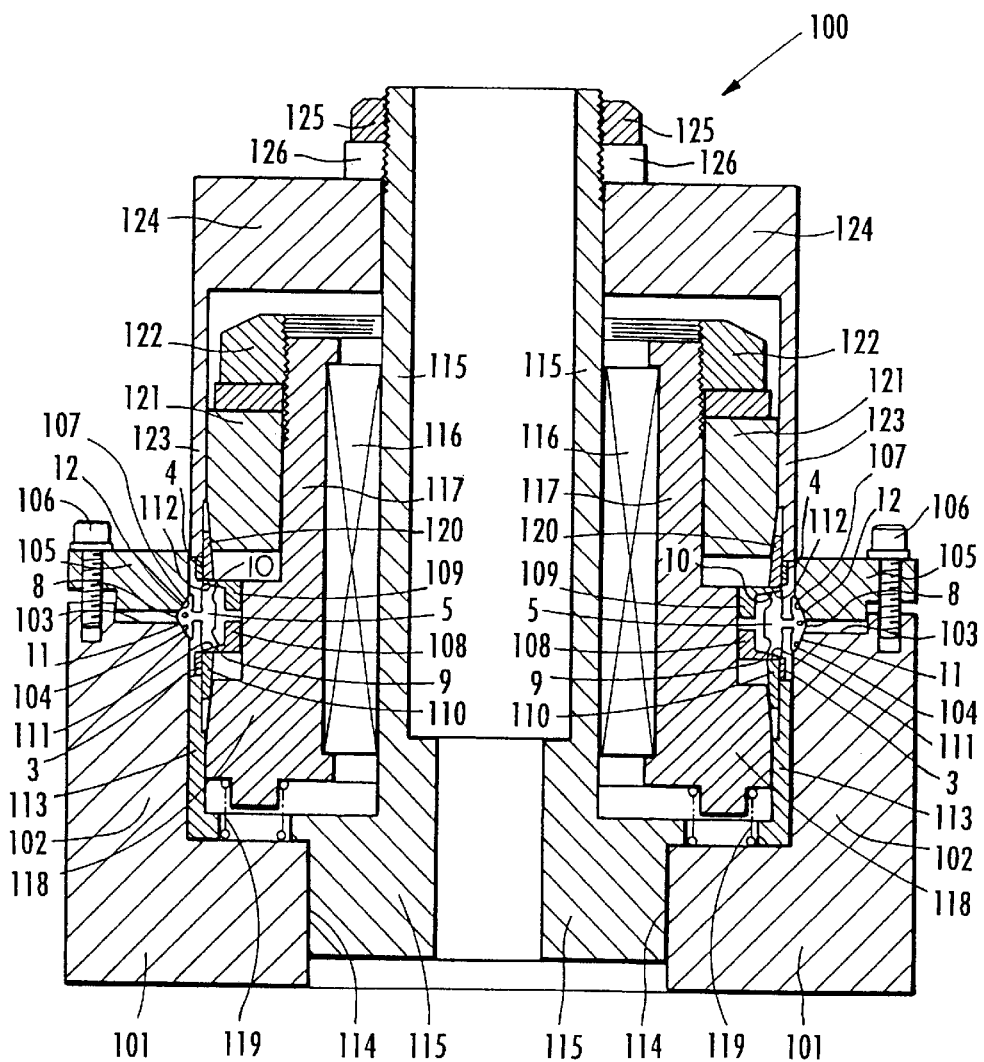
FIG. 3 is a vertical cross-sectional view of an assembling apparatus according to the present invention.

FIG. 3 shows an assembling apparatus 100, as the manufacturing apparatus according to the present invention, for assembling the belt 1 that is partly shown in FIG. 2. As shown in FIG. 3, the assembling apparatus 100 has a base 101 on its bottom and a side wall 102 extending upwardly from a peripheral edge portion of the base 101. The side wall 102 has on its upper end a first head holder 103 for placing the heads 8 of elements 2 thereon. The first head holder 103 has a first slanted surface 104 along an inner peripheral edge thereof. The first slanted surface 104 abuts against the slanted edges 11, shown as lower edges in FIG. 3, of the heads 8 for slidably supporting the slanted edges 11.

An annular second head holder 105 is vertically movably mounted on the side wall 102 above the first head holder 103 by bolts 106. The second head holder 105 has a second slanted surface 107 along an inner peripheral edge thereof. The second slanted surface 105 abuts against the slanted edges 12, shown as upper edges in FIG. 3, of the heads 8. The first head holder 103 and the second head holder 105 jointly make up an element pressing means. When the bolts 106 are tightened, the second head holder 105 is depressed toward the first head holder 103. The bolts 106 may be replaced with another depressing means such as a cylinder or motor for depressing the second head holder 105 toward the first head holder 103.

A first body holder 108 and a second body holder 109 for holding the bodies 5 of elements 2 are disposed radially inwardly of the first head holder 103 and the second head holder 105, respectively, with the elements 2 interposed therebetween. The first body holder 108 is movably mounted on a first collet 110 and has a first slanted surface 111 that abuts slidably against the slanted edges 9, shown as lower edges in FIG. 3, of the bodies 5. The second body holder 109 is disposed upwardly of the bodies 5 placed on the first body holder 108 and has a second slanted surface 112 that abuts slidably against the slanted edges 10, shown as upper edges in FIG. 3, of the bodies 5. The first body holder 108 and the second body holder 109 jointly make up an element holding means.

The first collet 110 is radially spreadable and disposed beneath the first body holder 108. The laminated ring 3 is placed on an outer circumferential surface of the first collet 110. Between the first collet 110 and the side wall 102, there is disposed a vertically movable first insert holder 113 as a first ring pressing means for pushing upwardly the laminated ring 3 placed on the first collet 110. The first insert holder 113 is integral with an outer peripheral edge of a first support shaft 115 that is vertically guided along an inner peripheral wall 114 of the base 101.

A second support shaft 117 is disposed around the first support shaft 115 and movable along the axis, which is shown as a vertical axis in FIG. 3, of the first support shaft 115 by a linear stroke bearing 116 interposed between the first support shaft 115 and the second support shaft 117. The second support shaft 117 has a first inner collet support 118 integral therewith which serves as a first spreading means for radially spreading the first collet 110. The first inner collet support 118 is normally biased to move upwardly by springs 119 mounted on the base 101.

A second collet 120 that is radially spreadable is disposed on the second body holder 109. The laminated ring 4 is placed on an outer circumferential surface of the second collet 120. Between the second collet 120 and the second support shaft 117, there is disposed a second inner collet support 121 around the second support shaft 117 for sliding movement along the axis of the second support shaft 117. The second inner collet support 121 serves as a second spreading means for radially spreading the second collet 120. An annular depressor 122 for depressing the second inner collet support 121 is disposed above the second inner collet support 121 and threaded over the second support shaft 117. When the annular depressor 122 is rotated, the second inner collet support 121 is depressed to radially spread the second collet 120. At the same time, the second support shaft 117 is lifted relatively to the second collet 120 to lift the first inner collet support 118 to radially spread the first collet 110. In the illustrated embodiment, the annular depressor 122 is rotated to move the first and second inner collet supports 118, 121. However, the annular depressor 122 may be replaced with an actuator means such as a cylinder or motor for moving the first and second inner collet supports 118, 121.

Between the second collet 120 and the second head holder 105, there is disposed a vertically movable second insert holder 123 as a second ring pressing means for pushing downwardly the laminated ring 4 placed on the second collet 120. The second insert holder 123 is integral with an outer peripheral edge of a slide block 124 that is vertically slidable along the first support shaft 115. An annular depressor 125 for depressing the slide block 124 is disposed above the slide block 124 and threaded over the first support shaft 115. When the annular depressor 125 is rotated, the slide block 124 and hence the second insert holder 123 are depressed, and the second insert holder 123 lowers the laminated ring 4 into the recess 7 in the element 2. At the same time, the first support shaft 115 is lifted relatively to the slide block 124 to lift the first insert holder 113, which pushes the laminated ring 3 upwardly into the recess 6 in the element 2. The annular depressor 125 may be replaced with an actuator means such as a cylinder or motor for moving the first and second insert holders 113, 123.

A load detecting means 126 such as a load cell is disposed between the slide block 124 and the annular depressor 125. The load detecting means 126 monitors the load applied when the annular depressor 125 depresses the slide block 124 for thereby detecting a load imposed when the laminated ring 4 is inserted into the recess 7 and a load imposed when the laminated ring 3 is inserted into the recess 6.

A process of assembling the belt 1 as carried out by the manufacturing apparatus according to the present invention will be described below with reference to FIGS. 4, 5(*a*) through 5(*d*), and 6(*a*) through 6(*d*).

Figure 4:
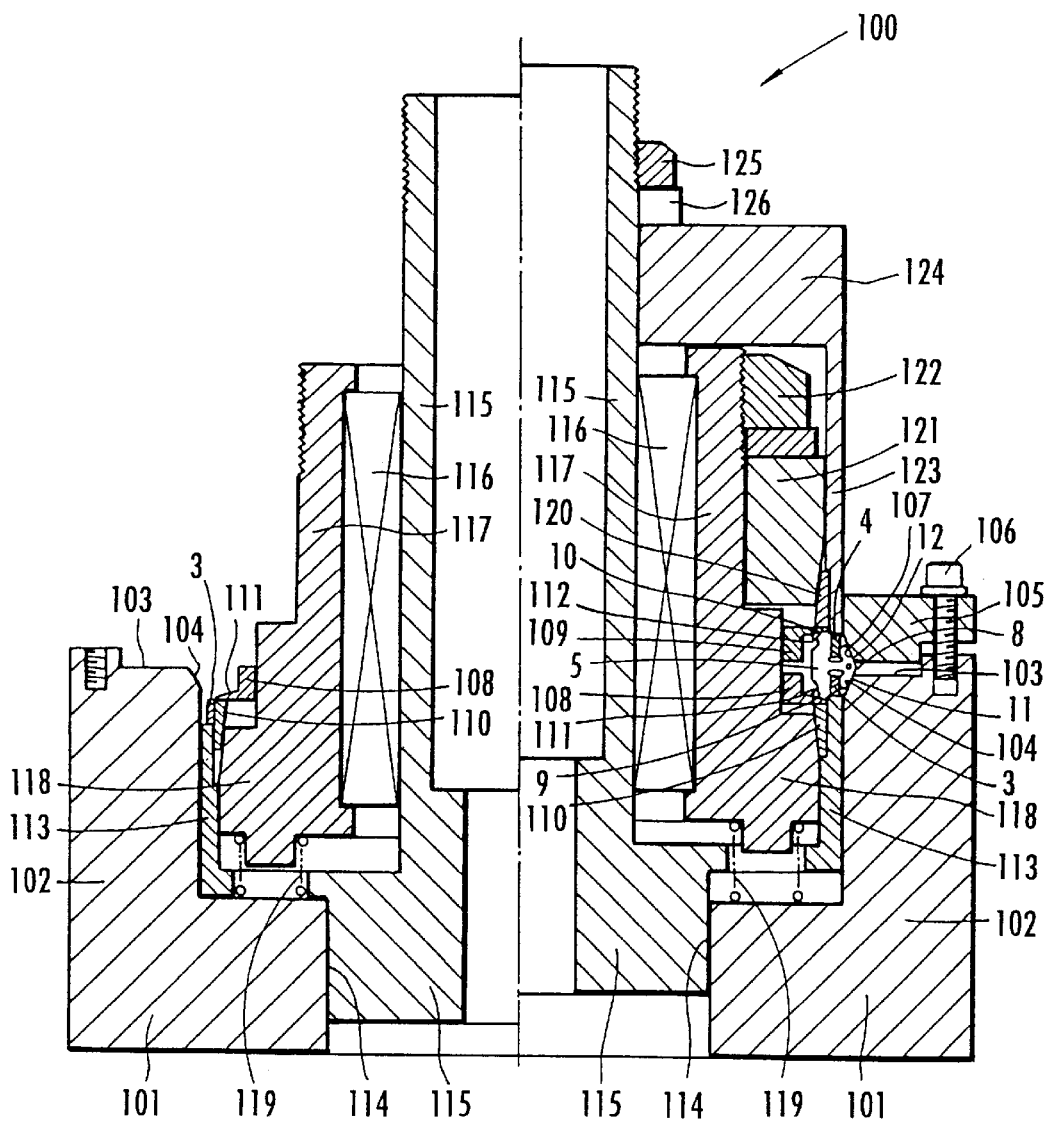
FIG. 4 is a vertical cross-sectional view showing the manner in which the assembling apparatus operates.
Figure 5:
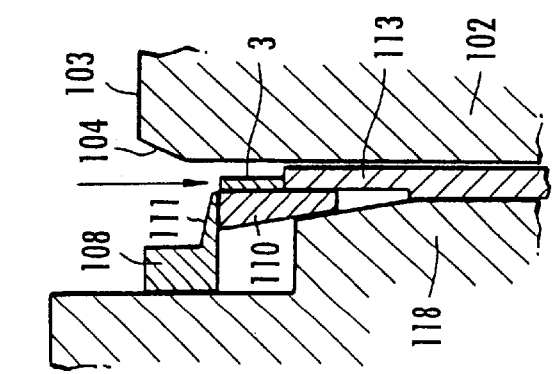
FIGS. 5(a) through 5(d) are fragmentary cross-sectional views illustrative of some steps of an assembling process carried out by the assembling apparatus shown in FIG. 3.
Figure 5:
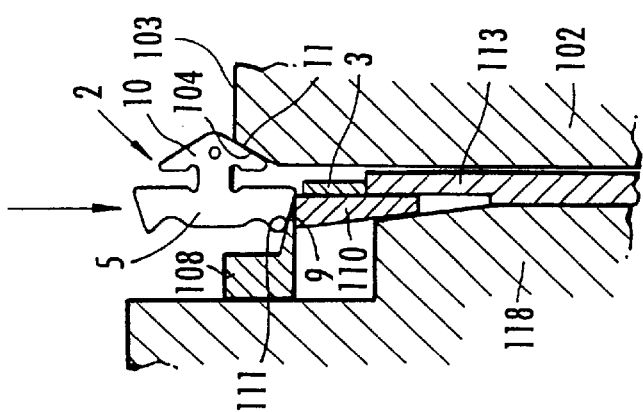
Figure 5:
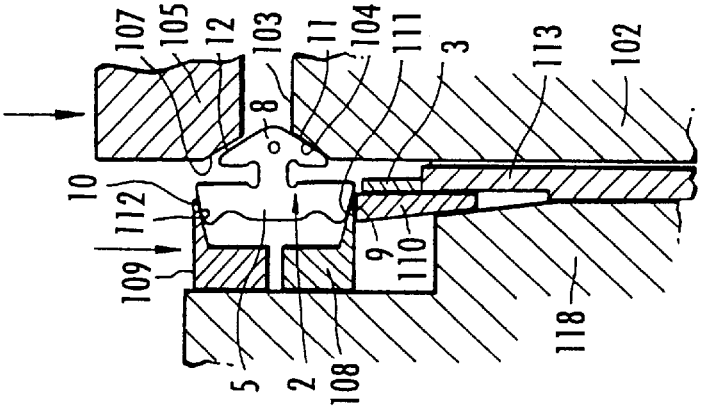
Figure 5:
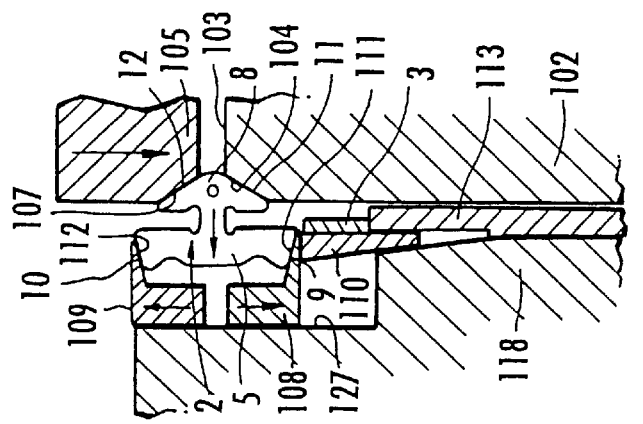

As shown in FIG. 5(*a*), the laminated ring 3 is placed around the first collet 110 and disposed edgewise on the upper tip end of the first insert holder 113. When the laminated ring 3 is thus positioned, the second insert holder 123, the second inner collet support 121, the second body holder 109, and the second head holder 105 have bee removed as shown in a left half of FIG. 4.

Then, as shown in FIG. 5(*b*), a plurality of elements 2 are laminated and arranged in an annular hoop with the bodies 5 placed on the first body holder 108 and the heads 8 on the first head holder 103. Since the elements 2 do not need to be in close contact with each other at this time, a desired number of elements 2 can be placed easily in position even though they have dimples 14 in their heads 8.

As shown in FIG. 5(*c*), the second body holder 109 is placed on the bodies 5 of the elements 2, and the second head holder 105 is placed on the heads 8 of the elements 2.

As shown in FIG. 5(*d*), the bolts 106 (see FIG. 3) are tightened to displace the second head holder 105 toward the first head holder 103. The spacing between the first slanted surface 104 of the first head holder 103 and the second slanted surface 107 of the second head holder 105 is reduced, causing the slanted edges 11, 12 of the heads 8 that are held against the respective slanted surfaces 104, 107 to slide along the slanted surfaces 104, 107. The elements 2 that are laminated in the annular hoop are now displaced in a direction from the heads 8 toward the bodies 5, and hence brought into close contact with each other. At this time, the first body holder 108 and the second body holder 109 are prevented from moving radially inwardly by a limiting surface 127 of the second support shaft 117 above the first inner collet support 118. As the slanted edges 9, 10 of the bodies 5 slide along the respective first and second slanted surfaces 111, 112, the first body holder 108 and the second body holder 109 are vertically displaced away from each other while holding the bodies 5. The displacement of the second head holder 105 toward the first head holder 103 upon tightening of the bolts 106 is stopped when the elements 2 are held closely against each other, so that the elements 2 are clamped in position.

Figure 6:
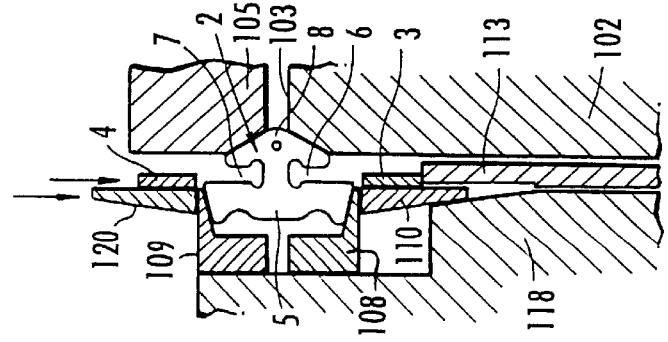
FIGS. 6(a) through 6(d) are fragmentary cross-sectional views illustrative of other steps, which follow the steps shown in FIGS. 5(a) through 5(d), of the assembling process carried out by the assembling apparatus shown in FIG. 3.

Then, as shown in FIG. 6(*a*), the second collet 120 is placed on the second body holder 109, and the other laminated ring 4 is placed around the second collet 120.

As shown in FIG. 6(*b*), the second inner collet support 121 is fitted over the second support shaft 117 in abutment against an inner peripheral surface of the second collet 120.

As shown in FIG. 6(*c*), the first inner collect support 118 radially spreads the first collet 110, and the second inner collect support 121 radially spreads the second collet 120. More specifically, as shown in FIG. 3, when the depressor 122 is rotated a certain angle to lower the second inner collet support 121, the second support shaft 117 and hence the first inner collet support 118 are lifted relatively to the second inner collet support 121. Therefore, the second collet 120 and the first collect 110 are simultaneously spread radially by a certain extent. The laminated rings 3, 4 placed around the collets 110, 120 are radially spread to a diameter positionally corresponding to the recesses 6, 7 in the clamped elements 2. Then, the second insert holder 123 is set around the second collet 120. Specifically, as shown in FIG. 3, the slide block 124 is fitted over the first support shaft 115, and the depressor 125 is threaded over the first support shaft 115 above the slide block 124.

Then, as shown in FIG. 6(*d*), the laminated ring 3 spread by the first collet 110 is lifted by the first insert holder 113, and the laminated ring 4 spread by the second collet 120 is lowered by the second insert holder 123. At this time, as shown in a right half of FIG. 4, when the depressor 125 is rotated a certain angle to lower the slide block 124, the first support shaft 115 is lifted relatively to the slide block 124. Therefore, the second insert holder 123 and the first insert holder 113 are simultaneously displaced toward each other by a certain distance. When the first insert holder 113 is lifted, the laminated ring 3 is inserted into the recesses 6 in the elements 2, and when the second insert holder 123 is lowered, the laminated ring 4 is inserted into the recesses 7 in the elements 2.

If the laminated rings 3, 4 cause scoring in the recesses 6, 7 or the diameters of the laminated rings 3, 4 do not match those of the recesses 6, 7, then such a state is detected as an undue load by the load detecting means 126 (see FIGS. 3 and 4). Any belt manufactured when such an undue load is detected by the load detecting means 126 is rejected as a defective product.

A belt 1 assembled by the above assembling process is removed from the manufacturing apparatus 100 by detaching the second insert holder 123, the second inner collet support 121, the second body holder 109, and the second head holder 105.

A method of and an apparatus for inspecting a belt for use in a continuously variable transmission according to the present invention will be described below with reference to FIGS. 7 through 10.

Figure 7:
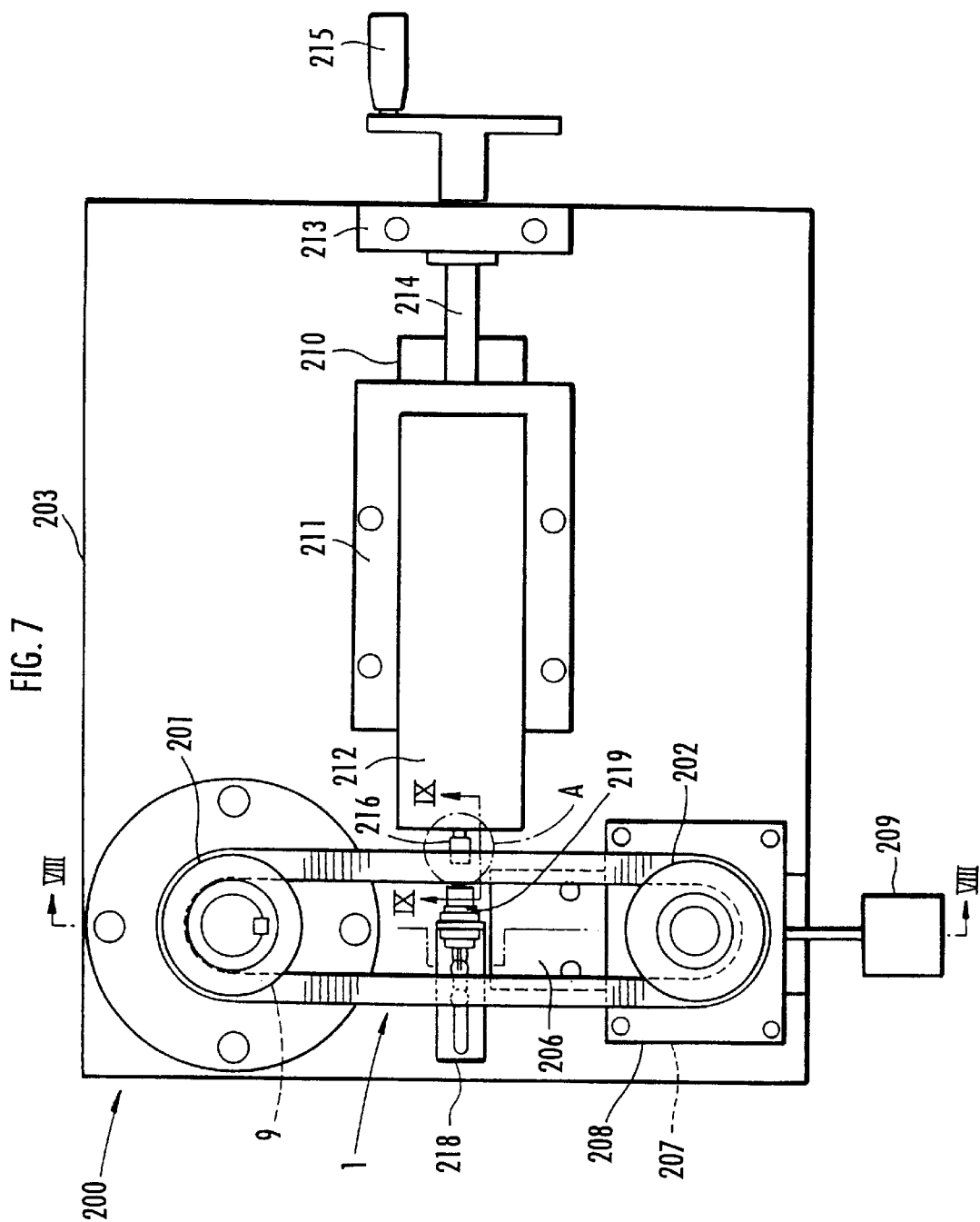
FIG. 7 is a front elevational view of an inspecting apparatus for use in a process of inspecting the belt according to the present invention.
Figure 8:
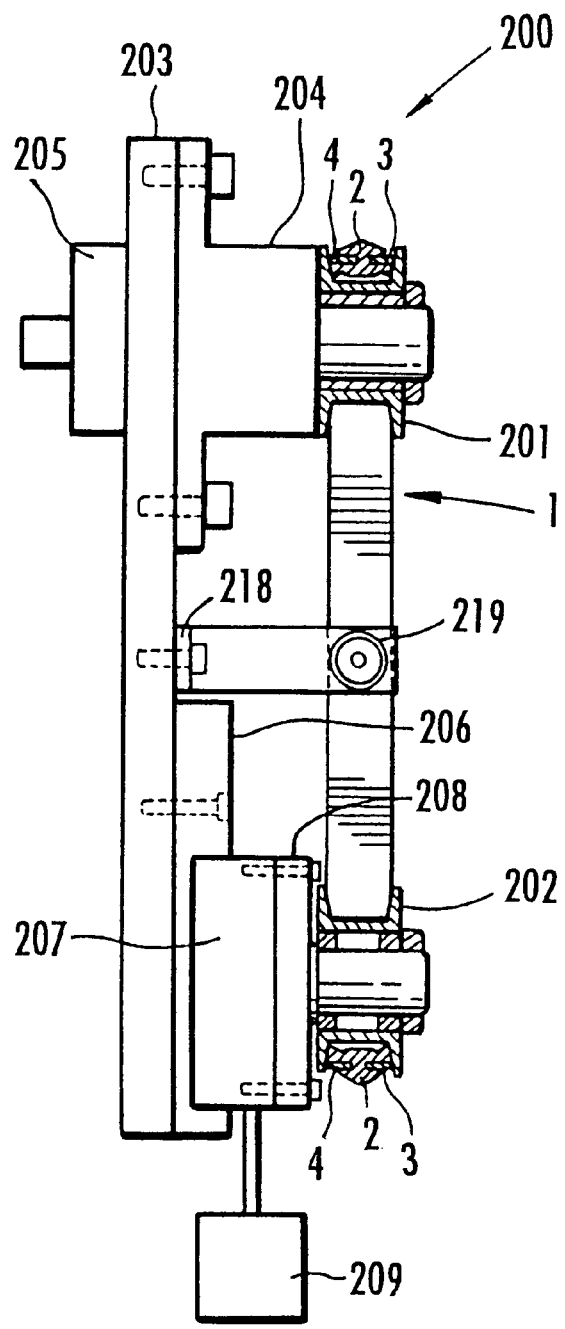
FIG. 8 is a cross-sectional view taken along line VIII—VIII of FIG. 7.

FIGS. 7 and 8 show an inspecting apparatus 200 for inspecting the belt 1 that is partly shown in FIG. 2.

As shown in FIGS. 7 and 8, the inspecting apparatus 200 has a drive roller 201 and a driven roller 202 around which the belt 1 is trained. The drive roller 201 is rotatably supported on a surface of a vertical flat base 203 by a support member 204, and coupled by a connecting mechanism, not shown, to a drive motor 205 as an actuator disposed inwardly of the support member 204.

The driven roller 202 is rotatably supported by a support member 208 on a linear guide 207 vertically slidably held in engagement with a vertical guide rail 206 fixedly mounted on the surface of the base 203 downwardly of the drive roller 201. The drive roller 201 and the driven roller 202 have substantially the same diameter.

A weight 209 as a tension applying means is suspended from the linear guide 207. The weight 209 is limited against downward movement by a stopper, not shown. When the stopper is positionally adjusted to allow the weight 209 to move downwardly a certain distance, the linear guide 207 is displaced downwardly the same distance along the guide rail 206, displacing the driven roller 202 downwardly away from the drive roller 201 by the same distance. Therefore, the belt 1 trained around the drive roller 201 and the driven roller 202 is tensioned.

A load sensor 212 is fixedly mounted on a linear guide 211 horizontally slidably held in engagement with a horizontal guide rail 210 fixedly mounted on the surface of the base 203. The guide rail 210 is located laterally of an intermediate position between the drive roller 201 and the driven roller 202. The linear guide 211 is coupled by a connecting mechanism, not shown, to an end of a shaft 214 that is rotatably supported by a support member 213 fixedly mounted on the base 203. A handle 215 is connected to the other end of the shaft 214. When the handle 215 is rotated in one direction, the rotation of the handle 215 is transmitted via the shaft 214 and the non-illustrated connecting mechanism to the linear guide 211, which moves horizontally along the guide rail 210 toward the belt 1. When the handle 215 is rotated in the opposite direction, the linear guide 211 is retracted away from the belt 1.

Figure 9:
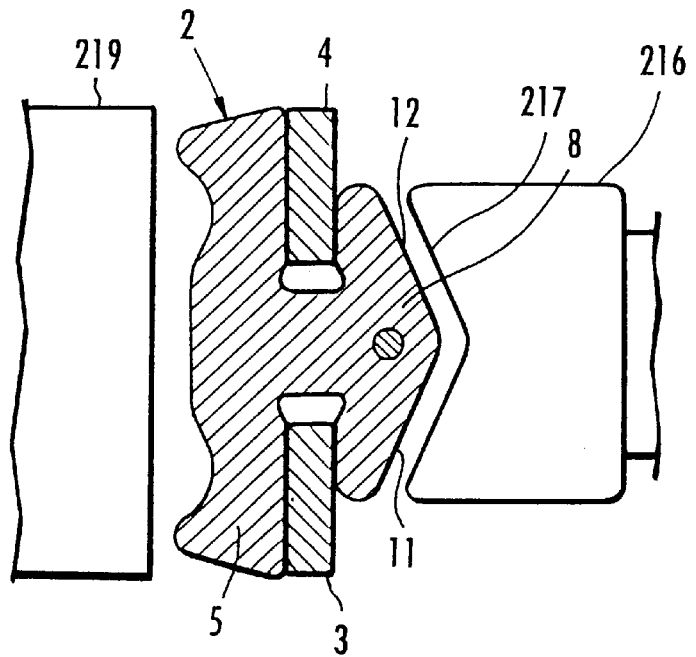
FIG. 9 is a cross-sectional view of an encircled portion A taken along line IX—IX of FIG. 7.

As shown in FIG. 9, the load sensor 212 has a plunger 216 on its distal end which has a substantially cross-sectionally V-shaped end face 217 complementary in shape to the slanted edges 11, 12 of the heads 8 of the elements 2. When the linear guide 211 moves along the guide rail 210 toward the belt 1, the plunger 216 pushes a portion of the belt 1 extending between the drive and driven rollers 201, 202 horizontally into the space defined within the belt 1. The load sensor 212 measures the load applied by the plunger 216 to push the belt 1. The guide rail 210, the linear guide 211, the load sensor 212, the support member 213, the shaft 214, the handle 215, and the plunger 216 jointly make up a pressing means.

A distance sensor 219 as a measuring means is supported on a support member 218 fixedly mounted on the surface of the base 203. The distance sensor 219 is positioned across the portion of the belt 1 between the drive and driven rollers 201, 202 from the load sensor 212. The distance sensor 219 can be positionally adjusted with respect to the portion of the belt 1 between the drive and driven rollers 201, 202, and fixed to the support member 218. When the plunger 216 of the load sensor 212 pushes the portion of the belt 1 between the drive and driven rollers 201, 202 horizontally into the space defined within the belt 1, the belt 1 is flexed inwardly. At this time, the distance sensor 219 measures the distance by which the belt 1 is flexed inwardly. The distance sensor 219 may comprises a laser distance sensor, for example.

An inspecting process carried out by the inspecting apparatus 200 will be described below.

The assembled belt 1 under test is trained around the drive roller 201 and the driven roller 202. Then, the non-illustrated stopper is adjusted in position to move the weight 209 downwardly a certain distance. The linear guide 207 is displaced the same distance downwardly along the guide rail 206. The driven roller 202 is spaced downwardly from the drive roller 201 by the same distance, applying a corresponding tension to the belt 1.

The drive motor 205 is energized to rotate the drive roller 201 to rotate the tensioned belt 1 for thereby breaking in the belt 1 until the belt 1 is rotated smoothly. The belt 1 now reaches a state as if it has actually been used. The period of time for and the rotational speed at which the drive motor 205 is energized to break in the belt 1 are determined depending on the structure and length of the belt 1.

The drive motor 205 is then de-energized to stop rotating the tensioned belt 1. The operator rotates the handle 215 in one direction to displace the linear guide 211 horizontally along the guide rail 210 toward the belt 1. The plunger 216 of the load sensor 212 pushes the portion of the belt 1 between the drive and driven rollers 201, 202 into the space defined within the belt 1. The load sensor 212 now measures the load applied by the plunger 216 to push the belt 1. The operator rotates the handle 215 until the measured load reaches a predetermined value.

When the portion of the belt 1 between the drive and driven rollers 201, 202 is pushed into the space defined within the belt 1 by the plunger 216, the belt 1 is flexed inwardly, and the distance sensor 219 measures the distance by which the belt 1 is flexed inwardly.

A normal belt 1 whose clearances between the elements 2 are appropriate and which has a required number of elements 2 has been broken in under tension in the same manner as described above, and the distance by which the portion of the normal belt 1 between the drive and driven rollers 201, 202 has been pushed under the load of the above predetermined value has been measured by the distance sensor 219. The measured distance is used as a reference distance.

The measured distance by which the belt 1 under test is flexed inwardly is compared with the reference distance. If the measured distance is equal to or smaller than the reference distance, then the belt 1 under test is judged as normal. If the measured distance is greater than the reference distance, then the belt 1 under test is judged as not normal, and then returned to the belt assembly process where the clearances between the elements 2 are adjusted and any lacking elements 2 are added. Consequently, assembled belts 1 can efficiently be inspected with stable accuracy without inspection personnel differences and different skill levels. As a result, the manufacturing apparatus can produce belts 1 of stable quality for use in continuously variable transmissions.

Since a belt 1 is trained around the vertically spaced drive and driven rollers 201, 202 under tension, the portion of the belt 1 between the drive and driven rollers 201, 202 extends vertically and is substantially free of any horizontal flexure. Therefore, the distance by which the belt 1 is flexed when the portion of the belt 1 between the drive and driven rollers 201, 202 is pushed under the predetermined load can accurately be measured by the distance sensor 219.

In the inspecting apparatus 200, the rotation of the handle 215 is transmitted through the shaft 214 and the non-illustrated coupling mechanism to the linear guide 211 to displace the linear guide 211 for thereby pushing the belt 1. However, the linear guide 211 may be displaced by a known cylinder, for example.

The inspecting apparatus 200 inspects the belt 1 while the belt 1 is being held at rest. However, a modified inspecting apparatus may inspect the belt 1 while the belt 1 is rotating. Such a modified inspecting apparatus will be described below with reference to FIG. 10. Those parts of the modified inspecting apparatus which are identical to those of the inspecting apparatus 200 shown in FIGS. 7 through 9 are denoted by identical reference numerals, and will not be described in detail below.

Figure 10:
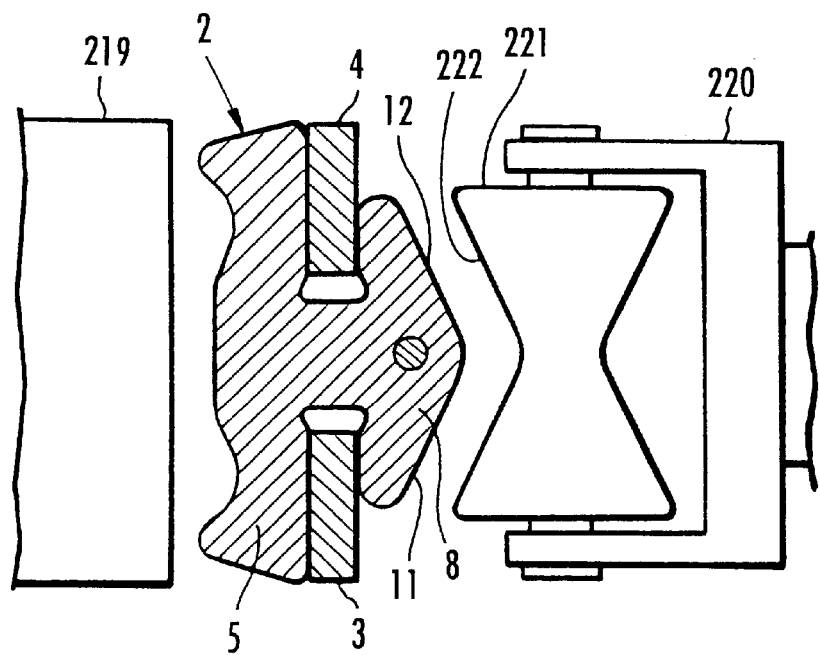
FIG. 10 is a cross-sectional view of a modification of the encircled portion A shown in FIG. 7.
Figure 11:
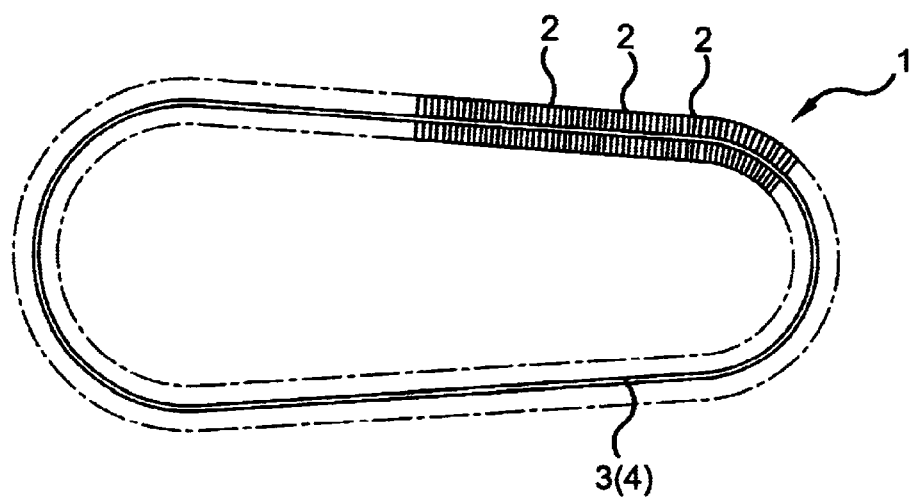
FIG. 11 shows the belt of the present invention including the elements and the annular rings.

As shown in FIG. 10, the modified inspecting apparatus has a load sensor including a plunger 220 that comprises a roller 221 rotatably supported for rotation in the same direction as the direction in which the belt 1 rotates. The roller 221 has a substantially cross-sectionally V-shaped peripheral surface 222 complementary in shape to the slanted edges 11, 12 of the heads 8 of the elements 2.

When the roller 221 of the plunger 220 contacts the slanted edges 11, 12 of the heads 8 and pushes the belt 1 in the direction toward the bodies 5 while the belt 1 is in rotation, the peripheral surface 222 of the roller 221 contacts the slanted edges 11, 12 and the roller 221 is rotated, reducing friction and impact upon contact between the roller 221 and the slanted edges 11, 12. Therefore, even when the belt 1 is in rotation, the distance by which the belt 1 is flexed when it is pushed by the plunger 220 can be measured by the distance sensor 219.

The modified inspecting apparatus shown in FIG. 10 can thus inspect the belt 1 while it is either at rest or being rotated after it has been broken in under tension, using the distance sensor 219 which measures the distance by which the belt 1 is flexed when pushed under the predetermined load by the load sensor 212.

Although certain preferred embodiments of the present invention have been shown and described in detail, it should be understood that various changes and modifications may be made therein without departing from the scope of the appended claims.

What is claimed is:

1. A method of manufacturing a belt for use in a continuously variable transmission which comprises an annular hoop of laminated metal elements each having a body and a head joined thereto with a pair of recesses defined therebetween, and a pair of rings inserted respectively in the recesses and each comprising a plurality of laminated metal web-shaped rings, comprising the steps of:

producing the elements by blanking the elements of desired shape out of a metal plate, by tempering, and by grinding for finishing;

producing the laminated rings by rolling sheet-like rings of desired shape from ring-shaped metal sheets, by subjecting the sheet-like rings to a solution treatment, by correcting circumferential lengths of the sheet-like rings, by aging and nitriding the sheet-like rings, and by laminating the sheet-like rings into a ring;

assembling the belt being manufactured by bundling the elements with the laminated rings;

inspecting said elements for bends, scratches, and cracks as a produced state thereof between the steps of producing the elements and assembling the belt being manufactured and sending those elements which are judged as acceptable to the step of assembling the belt;

inspecting said laminated rings for a number of web-shaped rings and a degree to which the web-shaped rings are held in close contact with each other as a laminated state thereof between the steps of producing the laminated rings and assembling the belt being manufactured and sending those laminated rings which are judged as acceptable to the step of assembling the belt;

inspecting the belts being manufactured for a laminated state thereof after assembling the belt and delivering those belts which are judged as acceptable as products;

adjusting an apparatus that performs the step of producing the elements by feeding inspected data of the elements that are judged as defective during the step of inspecting the elements for a produced state thereof back to the step of producing the elements;

adjusting an apparatus that performs the step of producing the laminated rings by feeding inspected data of the laminated rings that are judged as defective during the step of inspecting the laminated rings for a produced state thereof back to the step of producing the laminated rings; and adjusting an apparatus that performs the step of assembling the belts by feeding inspected data of the belts that are judged as defective during the step of inspecting the elements for a produced state thereof back to the step of assembling the belts, wherein said step of inspecting the belts being manufactured for an assembled state comprises the steps of:
  positioning a drive roller and a driven roller in a spaced relationship to each other;
  training a normal belt whose clearances between the elements are appropriate and which has a required number of the elements around the drive roller and the driven roller;
  displacing the drive roller and the driven roller away from each other to tension the normal belt;
  rotating the normal belt to break it in until the normal belt rotates smoothly;
  pressing a portion of the normal belt between the drive roller and the driven roller while the normal belt is resting or is rotating;
  measuring a reference distance by which the normal belt is flexed when the portion of the normal belt between the drive roller and said driven roller is pressed;
  training the belt being manufactured around the drive roller and the driven roller;
  displacing the drive roller and the driven roller away from each other to tension the belt being manufactured;
  rotating the belt being manufactured to break it until the belt being manufactured rotates smoothly;
  pressing a portion of the belt being manufactured between the drive roller and the driven roller while the belt being manufactured is resting or is rotating;
  measuring a distance by which the normal belt is flexed when the portion of the normal belt between the drive roller and said driven roller is pressed; and
  deciding the belt being manufactured is acceptable when the measured distance is equal to or smaller than the reference distance, while deciding the belt being manufactured is not acceptable when the measured distance is greater than the reference distance, the belts decided to be not acceptable having attributes including clearances between the elements that are not appropriate, or a number of the elements being different from the required number of the elements of the normal belt.

2. The method according to claim 1, wherein the step of assembling the belt being manufactured comprises the steps of:
  arranging a plurality of elements as an annular hoop with the bodies positioned inwardly, and pushing said elements in a direction from the heads toward the bodies to clamp the elements in close contact with each other;
  radially spreading said laminated rings which confront the respective recesses in the clamped elements to a diameter positionally corresponding to the recesses fully across the laminated rings; and
  pressing said radially spread laminated rings into the respective recesses in the elements;
  wherein said step of pressing said radially spread laminated rings into the respective recesses in the elements comprises the step of;
    detecting a load applied to the laminated rings while pressing said radially spread laminated rings into the respective recesses in the elements for thereby inspecting whether the belt being manufactured is acceptable or not.

3. The method according to claim 2, wherein said step of inspecting whether the belt being manufactured is acceptable or not comprises the step of:
  deciding that the belt being manufactured is not acceptable when an excessively large load is detected, the laminated rings being subjected to the excessively large load when the laminated rings cause scoring in the recesses or diameters of the laminated rings do not match those of the recesses.

4. A method of manufacturing a belt for use in a continuously variable transmission which comprises an annular hoop of laminated metal elements each having a body and a head joined thereto with a pair of recesses defined therebetween, and a pair of rings inserted respectively in the recesses and each comprising a plurality of laminated metal web-shaped rings, comprising the steps of:
  arranging a plurality of elements as an annular hoop with the bodies positioned inwardly, and pushing said elements in a direction from the heads toward the bodies to clamp the elements in close contact with each other;
  radially spreading said laminated rings which confront the respective recesses in the clamped elements to a diameter positionally corresponding to the recesses fully across the laminated rings;
  pressing said radially spread laminated rings into the respective recesses in the elements;
  inspecting the belts for a laminated state thereof after assembling the belt and delivering those belts which are judged as acceptable as products; and
  adjusting an apparatus that performs the step of assembling the belts by feeding inspected data of the belts that are judged as defective in inspecting the elements for a produced state thereof back to the step of assembling the belts,
  wherein said step of pressing said radially spread laminated rings into the respective recesses in the elements comprises the step of;
    detecting a load applied to the laminated rings while pressing said radially spread laminated rings into the respective recesses in the elements, for thereby inspecting whether the belt is acceptable or not.

5. The method according to claim 4, wherein said step of inspecting whether the belt being inspected is acceptable or not comprises the step of:
  deciding that the belt being inspected is not acceptable when an excessively large load is detected, the laminated rings being subjected to the excessively large load when the laminated rings cause scoring in the recesses or diameters of the laminated rings do not match those of the scoring in the recesses or diameters of the laminated rings do not match those of the recesses.

6. A method during a manufacturing process of inspecting a belt for use in a continuously variable transmission which comprises an annular hoop of laminated metal elements each having a body and a head joined thereto with a pair of recesses defined therebetween, and a pair of rings inserted respectively in the recesses and each comprising a plurality of laminated metal web-shaped rings, comprising the steps of:
  positioning a drive roller ad driven roller in a spaced relationship with each other;
  training a normal belt whose clearances between the elements are appropriate and which has a required number of the elements around a drive roller and a driven roller;
  displacing the drive roller and the driven roller away from each other to tension the normal belt;
  rotating the normal belt to break it in until the normal belt rotates smoothly;

pressing a portion of the normal belt between the drive roller and the driven roller while the normal belt is resting or is rotating;

measuring a reference distance by which the normal belt is flexed when the portion of the normal belt between the drive roller and said driven roller is pressed;

training a belt being inspected, around the drive roller and the driven roller;

displacing the drive roller and the driven roller away from each other to tension the belt;

rotating the belt being inspected to break it in until the belt being inspected rotates smoothly;

pressing a portion of the belt being inspected between the drive roller and the driven roller while the belt being inspected is resting or is rotating;

measuring a distance by which the normal belt is flexed when said portion of the normal belt between the drive roller and said driven roller is pressed;

deciding the belt being inspected is acceptable when the measured distance is equal to or smaller than the reference distance, while deciding the belt being inspected is not acceptable when the measured distance is greater than the reference distance, the belts decided to be not acceptable having attributes including clearances between the elements that are not appropriate, or a number of the elements being different from the required number of the elements of the normal belt.

* * * * *